(12) United States Patent
Jerbi et al.

(10) Patent No.: US 9,535,727 B1
(45) Date of Patent: Jan. 3, 2017

(54) IDENTIFYING VIRTUAL MACHINES THAT PERFORM INCONSISTENT WITH A PROFILE

(71) Applicant: CA, Inc., Islandia, NY (US)

(72) Inventors: Amir Jerbi, Givatayim (IL); Avi Kessel, Holon (IL); Shalom Shimoni, Lezion (IL); Yaron Holland, Hod Hasharon (IL)

(73) Assignee: CA, Inc., New York, NY (US)

( * ) Notice: Subject to any disclaimer, the term of this patent is extended or adjusted under 35 U.S.C. 154(b) by 313 days.

(21) Appl. No.: 13/762,152

(22) Filed: Feb. 7, 2013

(51) Int. Cl.
*G06F 9/455* (2006.01)

(52) U.S. Cl.
CPC .................. *G06F 9/45533* (2013.01)

(58) Field of Classification Search
CPC ............ G06F 2201/81; G06F 2201/815; G06F 2209/504; G06F 9/45533
See application file for complete search history.

(56) References Cited

U.S. PATENT DOCUMENTS

| | | | |
|---|---|---|---|
| 8,738,972 B1 * | 5/2014 | Bakman et al. ............. | 714/47.2 |
| 8,966,573 B2 * | 2/2015 | Barak et al. ............... | 726/1 |
| 2010/0017801 A1 * | 1/2010 | Kundapur ................. | 718/1 |
| 2011/0138385 A1 * | 6/2011 | Schmelter ........... | G06F 11/3466 718/1 |
| 2011/0302580 A1 * | 12/2011 | Iikura ................. | G06F 8/63 718/1 |
| 2012/0054746 A1 * | 3/2012 | Vaghani et al. ............ | 718/1 |
| 2013/0125112 A1 * | 5/2013 | Mittal et al. .............. | 718/1 |
| 2013/0305093 A1 * | 11/2013 | Jayachandran et al. ...... | 714/37 |
| 2014/0058871 A1 * | 2/2014 | Marr ................... | G06F 9/45533 705/26.1 |
| 2014/0059391 A1 * | 2/2014 | Chan et al. ............... | 714/45 |
| 2014/0082614 A1 * | 3/2014 | Klein et al. .............. | 718/1 |

* cited by examiner

*Primary Examiner* — Lewis A Bullock, Jr.
*Assistant Examiner* — Jacob Dascomb
(74) *Attorney, Agent, or Firm* — Myers Bigel, P.A.

(57) ABSTRACT

Methods, systems and computer program products for identifying virtual machines that perform inconsistent with a profile are provided. Methods may include collecting initial virtual machine data corresponding to multiple virtual machines. Multiple virtual machine profiles are generated and each of the virtual machine profiles is associated with one of multiple virtual machine types. Ones of the virtual machines are associated with one of the virtual machine profiles based on the virtual machine data. Additional virtual machine data corresponding to ones of the virtual machines is collected. The additional virtual machine data is analyzed to detect a deviation of one of the virtual machines.

17 Claims, 6 Drawing Sheets

IDENTIFYING VIRTUAL MACHINES THAT PERFORM INCONSISTENT WITH A PROFILE

BACKGROUND

The present disclosure relates to computer systems, and in particular to managing virtual machines that are deployed in a virtualized computer environment.

Virtualized computer environments, which may include cloud computing systems, composite information technology systems and computer cluster systems, are used to provide computer resources or other computing resources to end users. In a cloud computing environment, the physical hardware configuration is hidden from the end user. Cloud computing systems may include servers, network storage devices, routers, gateways, communication links, software (e.g., applications, operating systems, web services, etc.), and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computer environment, applications may be executed on virtual machines, which are isolated guest operating systems installed within a host system. Virtual machines are typically implemented with software emulation, hardware virtualization, or both. A single hardware and/or software platform may host a number of virtual machines, each of which may have access to some portion of the platform's resources, such as program code processing resources, storage resources, display resources, communication interfaces, etc.

Virtual machines may be configured and/or implemented to perform specific tasks, operations or functions or to execute specific applications or types of applications. Performance of virtual machines, both individually and aggregately, may rely on the virtual machines performing in accordance with a specific configuration. As such, performance of virtual machines in a cloud computing environment may be compromised by deviations in virtual machine behavior.

BRIEF SUMMARY

According to one aspect of the present disclosure methods of operating a computer system may include analyzing data corresponding to a virtual machine, generating a virtual machine profile corresponding to the virtual machine, and detecting a deviation of the virtual machine relative to the virtual machine profile.

In some embodiments, analyzing the data includes analyzing static data that includes attribute data corresponding to the virtual machine. Some embodiments provide that detecting the deviation includes analyzing dynamic data that includes usage data corresponding to the virtual machine and that is collected at a given temporal instant.

Some embodiments provide that generating the virtual machine profile includes generating an initial virtual machine profile. An updated virtual machine profile may be generated and the updated virtual machine profile may be compared to the initial virtual machine profile to detect a change in the virtual machine performance. In some embodiments, the virtual machine profile is updated corresponding to data received after generating the initial machine profile.

Some embodiments include analyzing data corresponding to multiple virtual machines and generating multiple virtual machine profile types. In some embodiments, the virtual machine profile types include installed software types, solution machine types, or data class types. Some embodiments provide that generating the virtual machine profile types includes generating each of the virtual machine types based on data aggregated corresponding to multiple virtual machines that correspond to the virtual machine type. In some embodiments, detecting the deviation of the virtual machine includes detecting the deviation of one of the virtual machines relative to a corresponding one of the virtual machine profiles.

Some embodiments include collecting virtual machine usage data that corresponds to the virtual machine and virtual machine attribute data that corresponds to the virtual machine.

Some embodiments include performing an automatic remediation operation responsive to detecting the deviation relative to the virtual machine profile. In some embodiments, performing the automatic remediation operation includes transmitting a message corresponding to the deviation responsive to detecting the deviation. Some embodiments provide that performing the automatic remediation includes storing data corresponding to the deviation in a data repository responsive to detecting the deviation. In some embodiments, performing the automatic remediation comprises changing an operation in the virtual machine responsive to detecting the deviation. Some embodiments provide that the operation change includes a network change, an operational status change, or a port activity change.

Some embodiments herein include methods of operating a computer system. Such methods may include collecting initial virtual machine data corresponding to multiple virtual machines and generating multiple virtual machine profiles. Each of the virtual machine profiles may be associated with one of multiple different virtual machine types. Ones of the virtual machines may be associated with one of the virtual machine profiles based on the virtual machine data. Additional virtual machine data corresponding to virtual machines may be collected and analyzed to detect a deviation of one of the virtual machines.

In some embodiments, collecting the initial virtual machine data includes collecting virtual machine usage data and virtual machine attribute data and collecting additional virtual machine data includes collecting updated virtual machine usage data and updated virtual machine attribute data.

Some embodiments provide that analyzing the additional virtual machine data includes comparing the additional virtual machine data to a corresponding one of the virtual machine profiles to detect the deviation. In some embodiments, the deviation includes a change in virtual profile type of one of the virtual machines from an initial virtual machine profile type to an updated virtual machine profile type.

Some embodiments include updating one of the virtual machine profiles responsive to collecting the additional virtual machine data or analyzing the additional virtual machine data. In some embodiments, analyzing the additional virtual machine data to detect the deviation of one of the virtual machines includes comparing the additional virtual machine data corresponding to one of the virtual machines to the virtual machine profile corresponding to that one of the virtual machines.

In some embodiments, analyzing the additional virtual machine data to detect the deviation of one of the virtual machines includes comparing the additional virtual machine data corresponding to one of the virtual machines to virtual machine data corresponding to one of the virtual machine types.

Some embodiments include automatically performing a remediation operation responsive to the virtual machine deviation analyzer detecting the deviation. In some embodiments, automatically performing the remediation operation includes causing a message corresponding to the deviation to be transmitted responsive to detecting the deviation, causing data corresponding to the deviation to be stored in a data repository responsive to detecting the deviation, or causing an operation change in the virtual machine responsive to detecting the deviation.

Some embodiments disclosed herein are directed to computer program products for operating a computer system including a virtual machine as described herein.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
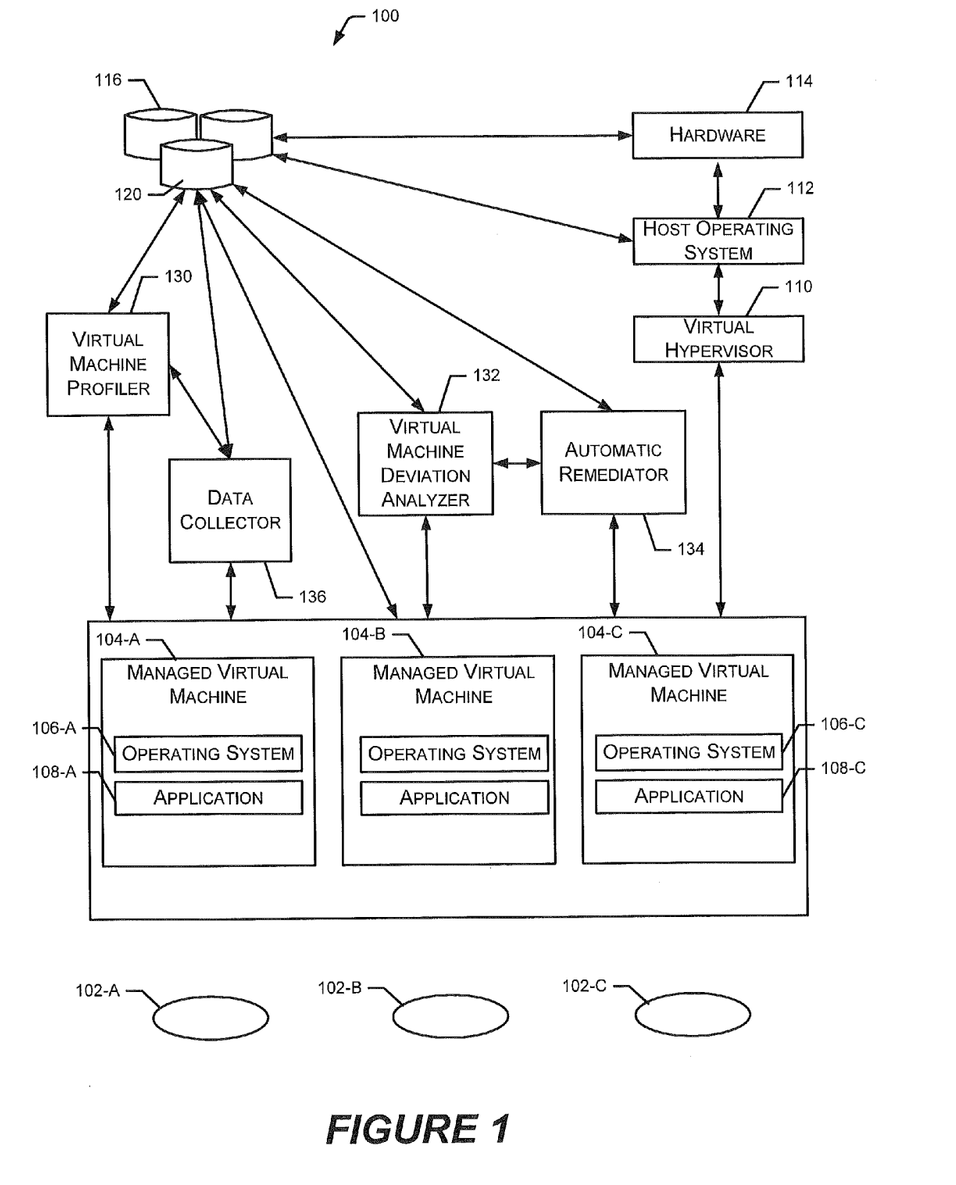
FIG. 1 is a block diagram of a computing system that supports a virtual operating environment according to an embodiment of the present inventive subject matter.

FIG. 1 illustrates a computer system 100 for a virtualized computing environment in which the subject matter of the present disclosure can be embodied. Although various embodiments are described in the context of a virtualized computing environment, the disclosure is not limited thereto and may be used to manage access to resources of non-virtual computer environments. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, a virtual machine profiler 130 may analyze data corresponding to a virtual machine 104. In some embodiments, the data that is analyzed by the virtual machine profiler may include static data, such as attribute data corresponding to the virtual machine. Examples of static data may include version identifiers, amount of memory allocated, the identity of one or more processing resources that are dedicated to the virtual machines 104, a host type, types and/or identifications of products installed on the virtual machines 104, and/or configurations of ports, among others. The static data may be collected using one or more inventory applications and/or products that may provide data corresponding to configurations and installed products on the virtual machines 104.

Some embodiments provide that the data that is analyzed by the virtual machine profiler 130 includes dynamic data that includes usage data corresponding to the virtual machine 104. The dynamic data may be collected at a given temporal instant and may include values that correspond only to that instant and/or a previous instant. Examples of dynamic data may include usage data such as the quantity of memory a virtual machine 104 is using, the quantity of processor resources the virtual machine 104 is using, the quantity and/or identity of open network ports, the quantity and/or identity of applications that are accessing the network, and/or the quantity and/or identity of applications that are running, among others.

In some embodiments, the virtual machine profiler 130 may generate a virtual machine profile corresponding to the virtual machine 104. The virtual machine profiler may generate an initial virtual machine profile based on the static and dynamic data initially collected, received and/or analyzed. In addition to the initial virtual machine profile, an updated virtual machine profile may be generated upon receipt of additional and/or updated static and/or dynamic data.

Some embodiments provide that the virtual machine profiler 130 analyzes data corresponding to multiple different virtual machines 104 and generates multiple different virtual machine profile types. For example, virtual machine profile types may correspond to the type of applications and/or software installed thereon, which may be referred to as solution machine types. Different solution machine types may include a database, a web server, a data center, a workstation, an archive, and/or a data and/or service monitoring machine profile type. In some embodiments, virtual machine profile types may correspond to whether a machine is a front end machine that is used in direct interaction with people or a back end machine that may be used in a primarily operations-based capacity.

Some embodiments provide that virtual machine profile types are characterized in terms of the sensitivity of data that the corresponding machines process, store, manage, transmit and/or otherwise access. For example, a particular machine profile type may correspond to a server that has access to credit card or other financial data. Another example may include a machine profile type that corresponds to a server that processes and/or accesses data that is subject to regulatory compliance, such as, for example, medical data. Additionally, a virtual machine 104 that is not utilized may be described as idle, which may be another virtual machine profile type.

In some embodiments, a data collector 136 may collect the data that corresponds to managed virtual machines 104 and provide the collected data to the virtual machine profiler 130. Although illustrated as providing the collected data directly to the virtual machine profiler 130, the data collector 136 may collect the data for transmission and/or storage to the database 120 and/or other portion of the data storage space 116. Some embodiments provide that the data collector 136 is a virtual machine usage collector that collects virtual machine usage data, which may include dynamic data. In some embodiments, the data collector 136 is a virtual machine attributes collector that collects virtual machine attribute data, which may include static data.

The system 100 may include a virtual machine deviation analyzer 132 that detects a deviation relative to the virtual machine profile generated by the virtual machine profiler 130. In some embodiments, the deviation may be a performance deviation in that the virtual machine performance has deviated from performance that corresponds to the virtual machine profile. In some embodiments, the deviation may be an operational deviation in that the virtual machine operations have deviated from those corresponding to the virtual machine profile. Some embodiments provide that the virtual machine deviation analyzer 132 compares the updated virtual machine profile to the initial virtual machine profile to detect the change in performance or profile of the virtual machine 104.

For example, a managed virtual machine 104 may have been deployed by an original owner to provide a particular function and/or service, but the original owner may have overlooked, forgotten about or lost control of the managed virtual machine 104. Another party, machine or application may be accessing, monitoring and/or controlling the previously deployed managed virtual machine 104 in a manner that is inconsistent with the original intent and/or configuration. A specific example may include a managed virtual machine 104 that was originally deployed as a web server machine and that has another, subsequently installed, unauthorized application or software installed thereon. The unauthorized application or software may be malware that is attempting access to other components of the original owner's network resources, which may present risk to the original owner. However, even if the unauthorized application or software is not malware, processing resources of the original owner may be misappropriated to a non-owner, which may present unnecessary additional expense to the original owner.

In some embodiments, the virtual machine deviation analyzer 132 detects the deviation a virtual machine 104 relative to a corresponding virtual machine profile that has been previously associated with the virtual machine 104. For example, a machine that was previously associated with a web server virtual machine profile may have an updated virtual machine profile corresponding to an idle managed machine. In this example, the virtual machine 104 may be shut down, restored, tagged and/or repurposed in response to detecting a deviation in performance and/or behavior.

The system 100 may include an automatic remediator 134 that performs a remediation operation in response to the virtual machine deviation analyzer 132 detecting the deviation relative to a virtual machine profile. For example, some embodiments provide that the automatic remediator 134 causes a message corresponding to the deviation to be transmitted to an owner, administrator, and/or other party and/or application. In some embodiments, the automatic remediator 134 causes data corresponding to the deviation to be stored in a data repository such as the database 120 and/or other portion of the data storage space 116. In this manner, data corresponding to any processes and/or states may be preserved. Additionally, the data corresponding to the deviation may be used to determine the source and/or remediation corresponding to the deviation.

In some embodiments, the automatic remediator 134 may cause the virtual machine 104 to be shut down and/or isolated in the case of particular types of deviations and/or virtual machine profile types. Similarly, the automatic remediator 134 may cause an operation change in the virtual machine 104 in response to the virtual machine deviation analyzer 132 detecting a deviation. Examples of an operation change include a network change, an operational status change, and/or a port activity change, among others. In some embodiments, virtual machines that are identified as not providing the services that they were assigned to do may be reassigned with a correct and/or modified profile, powered off or removed from the virtualization environment.

Figure 2:
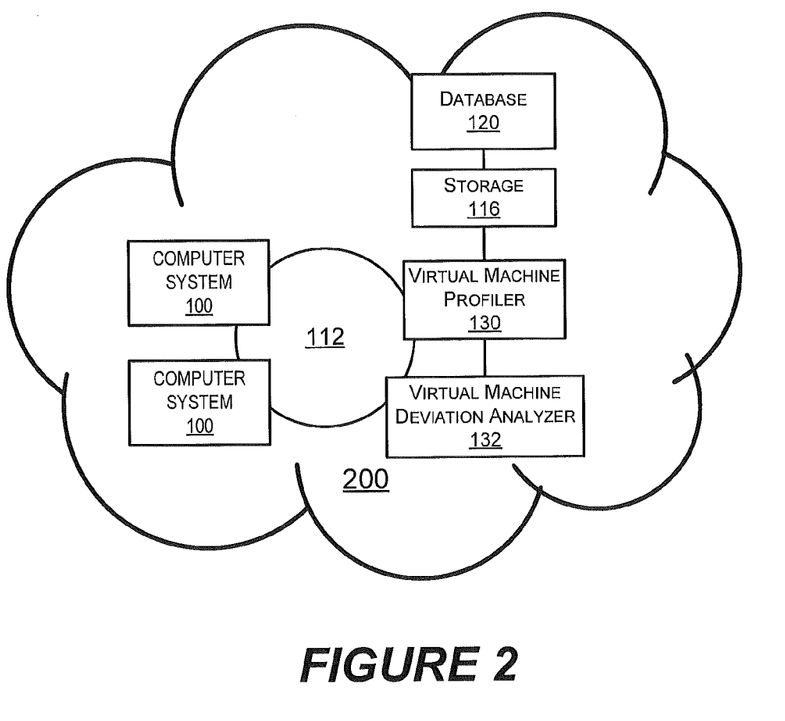
FIG. 2 illustrates a virtual computing environment according to an embodiment of the present inventive subject matter.

Reference is now made to FIG. 2, which illustrates a virtual computing environment according to some embodiments of the present inventive concepts. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 2 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

Virtual machines 104 that are deployed within a virtualization environment may share physical resources within a server 100. For example, virtual machines 104 may share physical data storage 116, a database 120 communication facilities and other resources or services of a server 100. Changes in behavior and/or performance of virtual machines 104 may be identified by comparing a virtual machine profile that is generated by a virtual machine profiler 130 with collected usage and/or attribute data using a virtual machine deviation analyzer 132.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines These tools may further be used to implement systems/methods according to some embodiments described herein.

Figure 3:
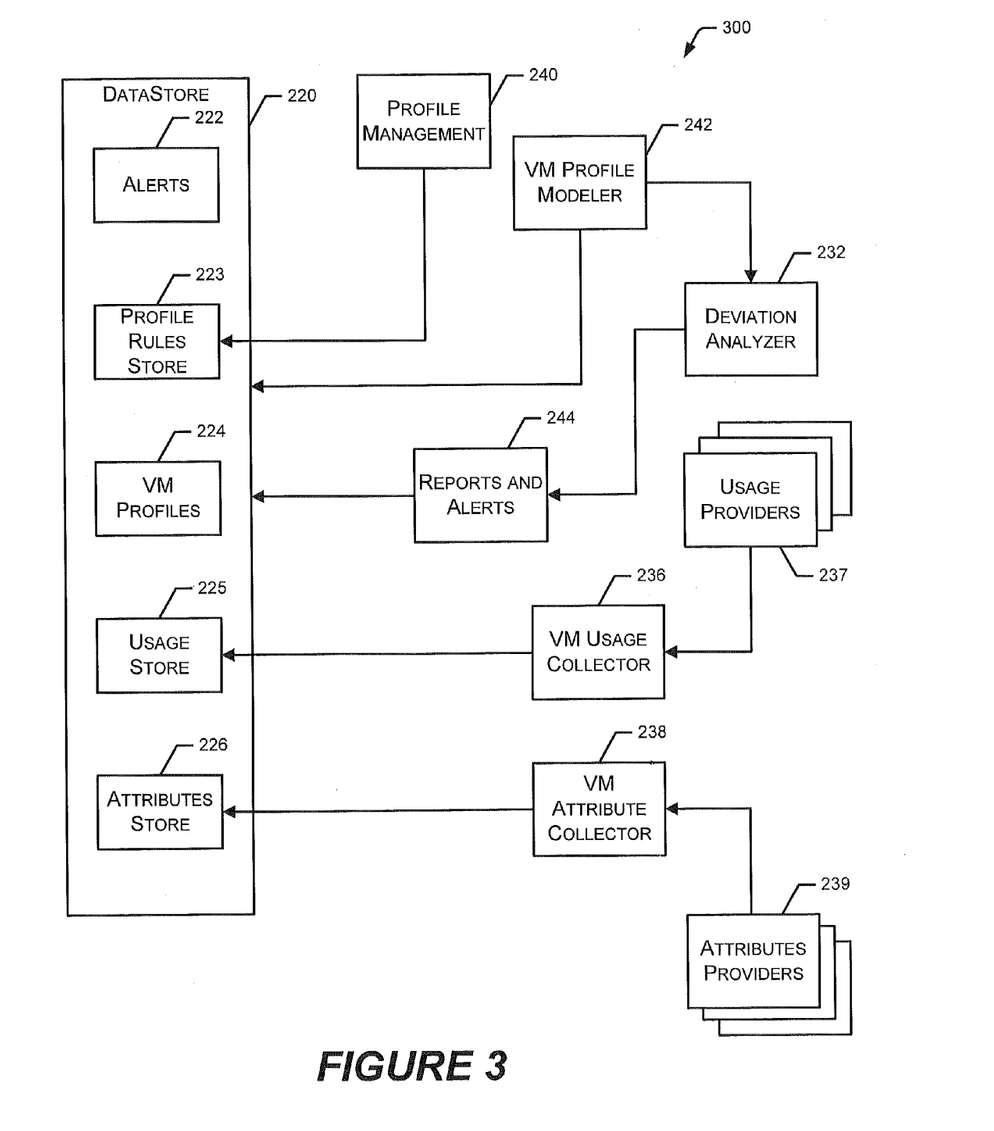
FIG. 3 illustrates a system according an embodiment of the present inventive subject matter.

FIG. 3 illustrates a system according an embodiment of the present inventive subject matter. The system 300 includes a virtual machine usage collector 236 that collects usage data corresponding to virtual machines in a network. In some embodiments, the virtual usage collector 236 collects the data from one of more usage providers 237 that monitor resource usage of virtual machines and/or collect usage data. For example, usage providers 237 may include applications, systems and/or services that monitor and/or measure virtual machine resource usage and audit logs.

Some embodiments provide that usage data may correspond to a specific time instant or interval and may include the quantity of memory a virtual machine is using, the quantity of processor resources the virtual machine is using, the quantity and/or identity of open network ports, the quantity and/or identity of applications that are accessing the network, and/or the quantity and/or identity of applications that are running, among others. Usage data collected by the virtual machine usage collector 236 may be transmitted to and/or stored in a usage store 225 that may be provided in a data store 220.

A virtual machine attributes collector 238 collects attribute data corresponding to virtual machines in the network. In some embodiments, the virtual machine attribute collector 238 collects the data from one of more attribute data providers 239 that may evaluate and tag virtual machines according to one or more properties. For example, attribute data providers 239 may include applications, systems and/or services that identify, inventory, categorize, characterize, and/or tag a virtual machine corresponding to configurations and installed products for ease of virtual environment management. Examples of attribute data may include version identifiers, amount of memory allocated, the identity of one or more processing resources that are dedicated to the virtual machines, a host type, types and/or identifications of products installed on the virtual machines, and/or configurations of ports, among others. Attribute data collected by the virtual machine attribute collector 238 may be transmitted to and/or stored in an attribute store 226 that may be provided in the data store 220.

The system 300 may include a virtual machine profile modeler 242 that may analyze the collected usage and attribute data and, according to profile rules, assign virtual machine profiles to virtual machines. Some embodiments provide that that the profile models are provided to the virtual machine profile modeler 242, however, the virtual machine profiler 242 may also generate new profile models based on an aggregation and analysis of usage and attribute data from multiple virtual machines. The virtual machine profiles may be stored in a virtual machine profile store 224 that may be provided in the data store 220.

The profile rules may be provided in a profile rules store 223 that may be provided in the data store 220. In some embodiments, a profile management module 240 may be provided for an administrator or system agent to define attributes and/or usage data that corresponds to each of multiple different virtual machine profiles. For example, a virtual machine with no applications running, no ports open and low processor utilization may be assigned an idle profile, whereas a combination of one or more specific programs running combined with certain ports open may identify the virtual machine as a particular type of database machine (e.g., an Oracle database).

Once the virtual machine profile modeler 242 assigns a profile to a virtual machine, if a profile change is detected from an earlier determined profile (e.g., by comparing newly assigned profiles to previously determined profiles), a deviation analyzer 232 may determine whether the profile change is an expected change. In some embodiments, determining whether the profile change is expected may be performed by comparing the profile change to profile changes and/or behavior of other virtual machines. A variety of analyses may be used by the deviation analyzer 232 to compare current virtual machine behavior to the previously assigned profile. For example, depending on the metrics used in the profile, threshold values, value ranges, statistical methods, and/or sum of differences, among others may be used.

Responsive to detecting a change in behavior or profile by the deviation analyzer 232, a reports and alerts module 244 may generate one or more reports and/or alerts. In some embodiments, reports and/or alerts may be sent to an administrator, customer and/or agent that optionally be installed within the virtual machine. In some embodiments, alerts generated by the reports and alerts module 244 may be stored in an alerts store 222 that may be provided in the data store 220.

In some embodiments, reports and/or alerts may result in one or more automatic actions or responses. For example, automatic remediation operations may be performed such as shutting the virtual machine down, closing, activating and/or inactivating one or more network ports, changing a network and/or a network identifier, sending one or more messages (e.g., email, telephone, short message service (SMS), etc.) and/or logging data corresponding to the change in a log file, among others.

Figure 4:
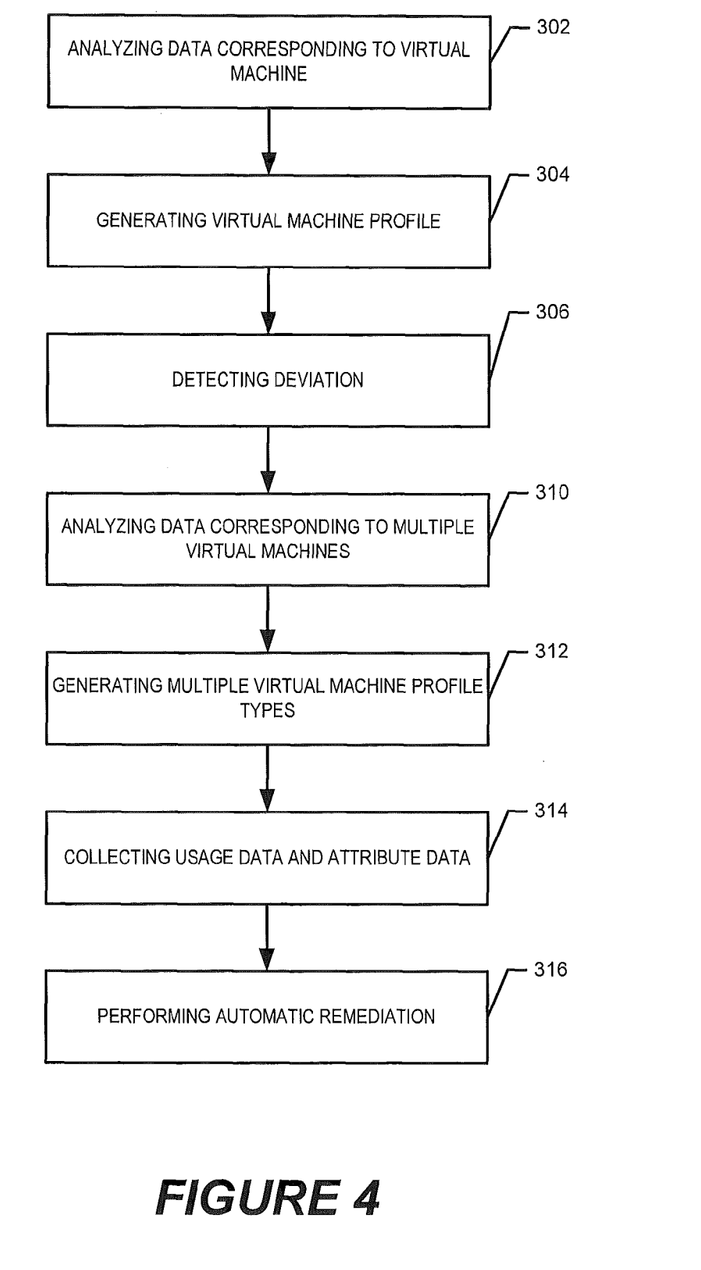
FIG. 4 is a flowchart illustrating operations for systems/methods according to an embodiment of the present inventive subject matter.

Reference is now made to FIG. 4, which is a flowchart illustrating operations for systems/methods according to an embodiment of the present inventive subject matter. Data corresponding to a virtual machine may be analyzed (block 302). The analyzed data may include static data that includes attribute data corresponding to the virtual machine. Attribute data may include version identifiers, amount of memory allocated, the identity of one or more processing resources that are dedicated to the virtual machines, a host type, types and/or identifications of products installed on the virtual machines, and/or configurations of ports, among others. In some embodiments, the analyzed data may include dynamic data that includes usage data corresponding to the virtual machine and that corresponds to a specific time instant and/or interval. For example, usage data may include the quantity of memory a virtual machine is using, the quantity of processor resources the virtual machine is using, the quantity and/or identity of open network ports, the quantity and/or identity of applications that are accessing the network, and/or the quantity and/or identity of applications that are running, among others.

A virtual machine profile may be generated based on the analysis of the attribute and/or usage data corresponding to the virtual machine (block 304). In some embodiments, generating the virtual machine profile includes generating an initial virtual machine profile. Some embodiments provide that, based on the analysis of the attribute and/or usage data, a previously defined virtual machine profile is assigned to the corresponding virtual machine. Whether a new virtual machine profile is generated for a virtual machine or an existing virtual machine profile is assigned to the virtual machine, a time stamp may also be generated corresponding to the association between the virtual machine and the virtual machine profile.

In some embodiments, generating the virtual machine profile includes generating or assigning an initial virtual machine profile to the virtual machine. An updated virtual machine profile may be generated and/or assigned based on attribute and/or usage data that collected after the initial virtual machine profile is generated and/or assigned. The updated virtual machine profile may be used to detect a deviation of the virtual machine relative to the virtual machine profile (block 306). For example, if an initially assigned profile indicates that a virtual machine is a database server and an updated virtual machine profile indicates that the virtual machine is idle, a virtual machine deviation may be detected by comparing the updated virtual machine profile to the initial virtual machine profile.

In addition to comparing individual virtual machine profiles corresponding to specific virtual machines, the attribute and/or usage data corresponding to multiple virtual machines may be analyzed (block 310). The analysis of data corresponding to multiple virtual machines may provide a basis for generating different virtual machine profiles and/or profile types (block 312). For example, virtual machine profile types may include software types that correspond to the type of major or primary software that is installed thereon. Different solution machine types may include a database, a web server, a data center, a workstation, an archive, and/or a data and/or service monitoring machine profile type. In some embodiments, virtual machine profile types may correspond to whether a machine is a front end machine that is used in direct interaction with people or a back end machine that may be used in a primarily operations-based capacity.

Some embodiments provide that virtual machine profile types are characterized in terms of the sensitivity and/or class of data that the corresponding machines process, store, manage, transmit and/or otherwise access. For example, a particular machine profile type may correspond to a server that has access to credit card or other financial data. Another example may include a machine profile type that corresponds to a server that processes and/or accesses data that is subject to regulatory compliance, such as, for example, medical data. Additionally, a virtual machine that is not utilized may be described as idle, which may be another virtual machine profile type. In some embodiments, the virtual machine types may be generated based on data aggregated corresponding to multiple different virtual machines that are the same virtual machine profile type. In this manner, models of virtual machine profiles may be generated and/or revised according to additional attribute and/or usage data from different virtual machines. Some embodiments provide that by using data from multiple machines and updating a virtual machine profile user additional data, the virtual machine profiles may reflect differences in virtual machine usage and attributes over time. Some embodiments provide that the deviation of a virtual machine relative to a corresponding one of the virtual machine profiles may be detected.

Some embodiments include collecting virtual machine usage data that corresponds to the virtual machine and virtual machine attribute data that corresponds to the virtual machine (block 314). The collected data may be used to analyze one or more virtual machines In some embodiments, the collected data may be transmitted to a database or other data repository. Some embodiments provide that a virtual machine usage collector may collect virtual machine usage data and/or a virtual machine attributes collector may collect virtual machine attribute data.

Some embodiments include performing an automatic remediation operation in response to detecting a deviation (block 316). By performing an automatic remediation operation, risks, inefficiencies and/or costs associated with a change in operation, function and/or behavior of a virtual machine may be mitigated. Brief reference is made to FIG. 5, which is a flowchart illustrating operations for performing automatic remediation according to some embodiments herein. Some embodiments provide that the automatic remediation includes transmitting a message corresponding to the deviation (block 320). For example, responsive to detecting the deviation an message may be transmitted to an owner, administrator, and/or other party and/or application. In some embodiments, data corresponding to the deviation of a virtual machine may be stored in a data repository such as a database and/or other portion of a data storage space (block 322). In this manner, data corresponding to any processes and/or states may be preserved. Additionally, the data corresponding to the deviation may be used to determine the source and/or remediation corresponding to the deviation.

Figure 5:
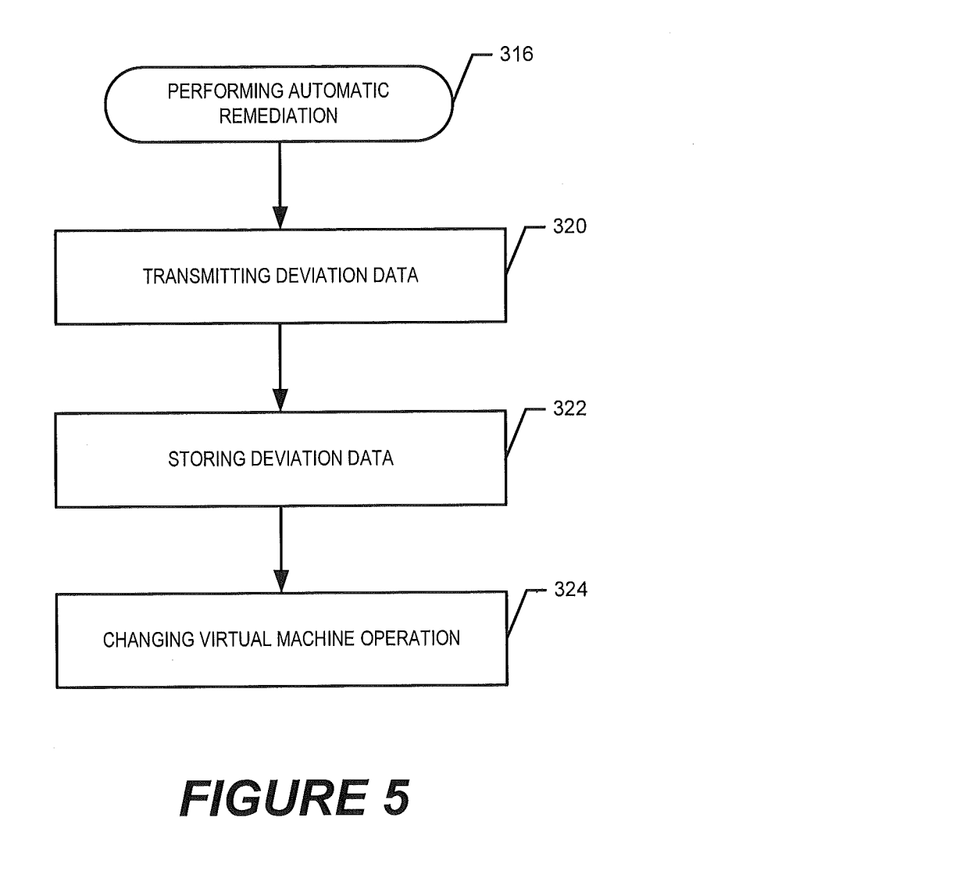
FIG. 5 is a flowchart illustrating operations for systems/methods to perform automatic remediation operations described in reference to FIG. 4.

In some embodiments, automatic remediation may include changing a virtual machine operation (block 324). For example, automatic remediation may include shutting the virtual machine down, and/or isolating the virtual machine in the case of particular types of deviations and/or virtual machine profile types. For example, where a deviation and/or virtual machine profile type indicates a potential risk to other network, system, owner and/or organization assets, resources and/or security, a virtual machine may be isolated from other network resources and/or nodes. In some embodiments, an operation change may include a network change, an operational status change, and/or a port activity change, among others. In some embodiments, virtual machines that are identified as not providing the services that they were assigned to do may be reassigned with a correct and/or modified profile.

Figure 6:
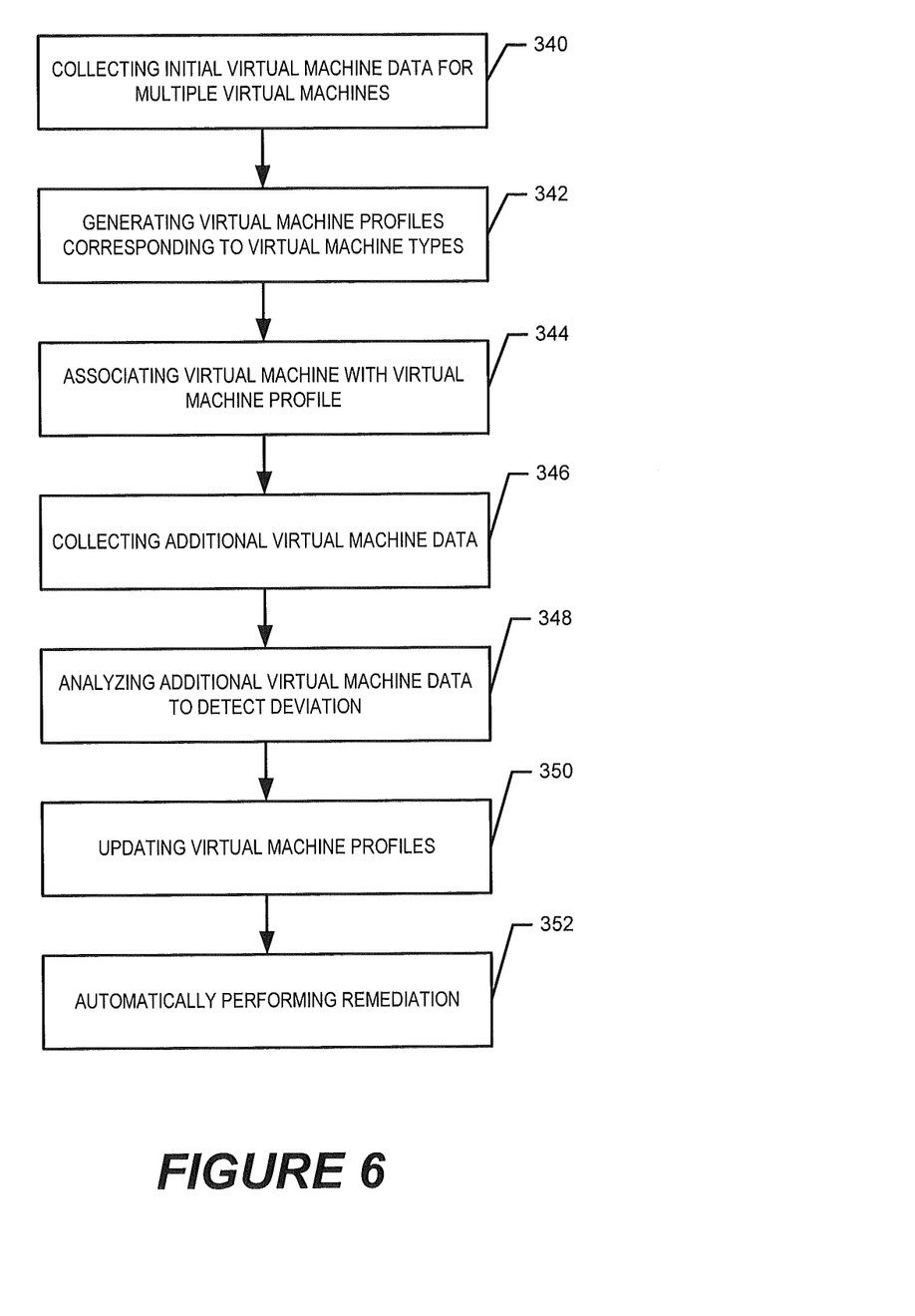
FIG. 6 is a flowchart illustrating operations for systems/methods according to an embodiment of the present inventive subject matter.

Reference is now made to FIG. 6, which is a flowchart illustrating operations for systems/methods according to an embodiment of the present inventive subject matter. Some embodiment include collecting initial virtual machine data corresponding to multiple virtual machines in one or more virtual environments (block 340). The initial virtual machine data may include virtual machine usage data and/or virtual machine attribute data.

Multiple virtual machine profiles may be generated (block 342). Some embodiments provide that each of the virtual machine profiles may be associated with a particular type of virtual machine. For example, a virtual machine type may be determined based on a major or primary software installed thereon, a type of data stored on and/or accessed by the virtual machine, and/or a level of accessibility, exposure and/or interaction with people. Based on the collected usage and/or attribute data, different virtual machines may be associated with corresponding virtual machine profiles (block 344).

Additional virtual machine data corresponding to ones of the virtual machines may be collected (block 346). For example updated virtual machine usage data and updated virtual machine attribute data may be collected. The additional virtual machine data may be analyzed to detect a deviation of individual ones of the virtual machines (block 348). A detected deviation may include a change in virtual profile and/or profile type of a virtual machine from an initial virtual machine type, virtual machine profile and/or virtual machine profile type. In some embodiments, the change in profile and/or profile type may correspond to an updated virtual machine profile and/or profile type.

Some embodiments provide that deviations may be detected by comparing the additional virtual machine data to previously assigned and/or associated virtual machine profiles. In some embodiments, the analysis may include detecting a deviation from the profile type that is not specific to a particular virtual machine. However, some embodiments provide that the analysis may include detecting a deviation relative to a profile previously generated, associated and/or assigned to the same virtual machine.

In some embodiments, the collected data may not indicate a deviation sufficient to trigger a detection but may provide additional data that may be used to update and/or modify one or more virtual machine profiles (block 350). In this manner, the virtual machine profiles may evolve in accordance with changes in technology, usage and/or application trends. Some embodiments provide that a virtual machine profile may be updated in response to collecting the additional virtual machine data and/or analyzing the additional virtual machine data.

In some embodiments, a detected deviation may be sufficient to warrant subsequent action or inquiry. In such embodiments, a remediation operation may be performed automatically in response to the virtual machine deviation analyzer detecting the deviation (block 352). Some embodiments provide that a remediation operation includes transmitting a message corresponding to the deviation. Some embodiments provide that a remediation operation includes causing data corresponding to the deviation to be stored in a data repository. In some embodiments, a remediation operation may include causing an operation change in the virtual machine.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of operating a computer system, the method comprising:
    analyzing static data and dynamic data corresponding to a virtual machine of a plurality of virtual machines, wherein the static data is attribute data corresponding to the virtual machine and dynamic data is usage data collected at a given temporal instant corresponding to the virtual machine;
    assigning an initial virtual machine profile type from a plurality of virtual machine profile types based on the static and dynamic data corresponding to the virtual machine, wherein the plurality of virtual machine profile types include at least two of: a profile type directed to the types of software running on the virtual machine, a profile type directed to the type of physical attributes associated with the virtual machine, and a profile type directed to the current architectural usage of the virtual machine by the user, and wherein each virtual machine profile type was generated by a unique previous analysis of data associated with the plurality of virtual machines;
    determining a subset of the plurality of virtual machines that are of the same profile type as the initial virtual machine profile type;
    generating an updated virtual machine profile type based on additional data corresponding to the virtual machine and based on aggregated additional data corresponding to the subset of the plurality of virtual machines that were determined to have the same profile type as the initial virtual machine profile type;
    detecting a deviation of the virtual machine relative to the initial virtual machine profile by detecting that the initial virtual machine profile type corresponds to a first virtual machine profile type and that the updated virtual machine profile type corresponds to a second virtual machine profile type that is different from the first virtual machine profile type;
    determining whether the deviation is expected or not based on detecting that other virtual machines in the subset are not associated with a virtual machine profile that corresponds to the second virtual machine profile type; and
    if it is determined that there is a deviation and the deviation is not expected, performing an automatic remediation operation that comprises transmitting a message corresponding to the deviation, storing data corresponding to the deviation, and changing an operating parameter of the virtual machine.

2. The method according to claim 1, wherein generating the updated virtual machine profile type comprises updating the initial virtual machine profile type with data received after assigning the initial virtual machine profile type.

3. The method according to claim 1, wherein assigning the initial virtual machine profile type comprises generating each of the plurality of virtual machine profile types based on data aggregated corresponding to multiple ones of the plurality of virtual machines that correspond to the respective one of the plurality of virtual machine profile types.

4. The method according to claim 1, further comprising collecting virtual machine usage data that corresponds to the virtual machine and virtual machine attribute data that corresponds to the virtual machine.

5. The method according to claim 1, wherein the changing the operating parameter comprises causing a network change, an operational status change, or a port activity change.

6. The method according to claim 1, wherein the initial virtual machine profile type includes data corresponding to a virtual machine type, virtual machine identity, a data type, and/or a type of application.

7. The method according to claim 1, wherein the plurality of virtual machine profile types further comprise virtual machine profile types that correspond to whether a virtual machine is a front end machine used in direct interaction with people or a back end machine that is not used in direct interaction with people.

8. The method of claim 1, wherein the attribute data corresponding to the virtual machine comprises one of a virtual machine identifier associated with the virtual machine, an amount of memory allocated to the virtual machine, and a software product identifier of a software product installed on the virtual machine.

9. A system comprising:
    a data collector that collects static data and dynamic data corresponding to a virtual machine of a plurality of virtual machines, wherein the static data is attribute data corresponding to the virtual machine and the dynamic data is usage data collected at a given temporal instant corresponding to the virtual machine;
    a virtual machine profiler that:
        analyzes the static and dynamic data and assigns an initial virtual machine profile type from a plurality of virtual machine profile types based on the static data and the dynamic data corresponding to the virtual machine, wherein the plurality of virtual machine profile types includes at least two of: a profile type directed to the types of software running on the virtual machine, a profile type directed to the type of physical attributes associated with the virtual machine, and a profile type directed to the current architectural usage of the virtual machine by the user, and wherein each virtual machine profile type was generated by a unique previous analysis of data associated with the plurality of virtual machines,
        determines a subset of the plurality of virtual machines that are of a same profile type as the initial virtual machine profile type, and
        generates an updated virtual machine profile type based on additional data corresponding to the subset of the plurality of virtual machines that were determined to have the same profile type as the initial virtual machine profile type, a virtual machine deviation analyzer that detects an unexpected deviation of the virtual machine relative to the initial virtual machine profile type, and determines whether the deviation is expected or not expected; and an automatic remediator that performs a remediation operation responsive to detecting the deviation and determining that the deviation detected by the virtual machine deviation analyzer is not expected, wherein the remediation operation comprises transmitting a message corresponding to the deviation, storing data corresponding to the deviation, and changing an operating parameter of the virtual machine, wherein the data collector, the virtual machine profiler, the virtual machine deviation analyzer, and the automatic remediator are implemented via a combination of software and hardware, wherein the virtual machine profiles comprise a plurality of virtual machine profile types that correspond to whether a virtual machine is a front end machine used in direct interaction with people or a back end machine that is not used in direct interaction with people, wherein the virtual machine deviation analyzer determines that the deviation has occurred based on a determination that the initial virtual machine profile type corresponds to a first virtual machine profile type and that the updated virtual machine profile type corresponds to a second virtual machine profile type that is different from the first virtual machine profile type, and wherein the virtual machine deviation analyzer determines whether the deviation is expected or not expected by detecting that other virtual machines in the subset are not associated with an updated virtual machine profile that corresponds to the second virtual machine profile type.

10. The system according to claim 9, wherein the data collector collects virtual machine data corresponding to the plurality of virtual machines that comprises virtual machine usage data and virtual machine attribute data, and wherein the data collector collects additional virtual machine data corresponding to the virtual machine that comprises updated virtual machine usage data and updated virtual machine attribute data.

11. The system according to claim 10, wherein the virtual machine deviation analyzer compares the additional virtual machine data with corresponding data from the virtual machine data corresponding to the plurality of virtual machines.

12. The system according to claim 10, wherein the virtual machine profiler updates one of the virtual machine profile types responsive to the additional virtual machine data.

13. The system according to claim 10, wherein the virtual machine deviation analyzer compares the additional virtual machine data corresponding to the virtual machine with the initial virtual machine profile type corresponding to the virtual machine.

14. The system according to claim 10, wherein the virtual machine deviation analyzer compares the additional virtual machine data corresponding to the virtual machine with virtual machine data corresponding to one of the plurality of virtual machine profile types.

15. A computer program product for operating a computer system including a plurality of virtual machines, the computer program product comprising:

a non-transitory computer readable storage medium having computer readable program code embodied therein, the computer readable program code comprising:

computer readable program code to analyze static data and dynamic data corresponding to a virtual machine of the plurality of virtual machines, wherein the static data is attribute data corresponding to the virtual machine and the dynamic data is usage data collected at a given temporal instant corresponding to the virtual machine;

computer readable program code to assign, based on the static data and the dynamic data corresponding to the virtual machine, an initial virtual machine profile type from a plurality of virtual machine profile types, wherein the plurality of virtual machine profile types include at least two of: a profile type directed to the types of the software running on the virtual machine, a profile type directed to the type of physical attributes associated with the virtual machine, and a profile type directed to the current architectural usage of the virtual machine by the user, and wherein each virtual machine profile type was generated by a unique previous analysis of data associated with the plurality of virtual machines;

computer readable program code to determine a subset of virtual machines from the plurality of virtual machines, wherein each virtual machine of the subset of virtual machines is associated with a virtual machine profile type that corresponds to the initial virtual machine profile type;

computer readable program code to generate an updated virtual machine profile type based on additional data corresponding to the virtual machine and based on aggregated additional data corresponding to the subset of virtual machines that were determined to have a same profile type as the initial virtual machine profile type;

computer readable program code to detect a deviation of the virtual machine from the initial virtual machine profile type, wherein detecting the deviation is based on determining that the initial virtual machine profile type corresponds to a first virtual machine profile type and that the updated virtual machine profile type corresponds to a second virtual machine profile type that is different from the first virtual machine profile type;

computer readable program code to determine whether the deviation is expected or not based on a determination that other virtual machines of the subset of virtual machines are not associated with a virtual machine profile associated with the second virtual machine profile type; and computer readable code to perform an automatic remediation operation that comprises transmitting a message corresponding to the deviation, storing data corresponding to the deviation, and changing an operating parameter of the virtual machine, if it is determined that there is a deviation and that the deviation is not expected.

16. The computer program product according to claim 15, wherein the plurality of virtual machine profile types further comprise virtual machine profile types that correspond to whether a virtual machine is a front end machine used in direct interaction with people or a back end machine that is not used in direct interaction with people.

17. The computer program product according to claim 15, wherein the automatic remediation operation comprises one of shutting down the virtual machine, isolating the virtual machine for a network resource, and causing a message corresponding to the deviation to be transmitted.

\* \* \* \* \*